United States Patent
Mayer et al.

(10) Patent No.: US 6,195,763 B1
(45) Date of Patent: Feb. 27, 2001

(54) FAULT DIAGNOSTIC DEVICE AND METHOD

(75) Inventors: Rudi Mayer, Vaihingen; Holger Bellmann, Ludwigsburg; Gudrun Menrad, Stuttgart; Dieter-Andreas Dambach, Korntal-Münchingen; Jürgen Wolf, Karlsruhe; Rainer Frank, Sachsenheim; Hans Hillner, Karlsruhe; Juergen Schiemann, Markgroeningen; Georg Mallebrein, Korntal-Münchingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/088,612

(22) Filed: Jun. 1, 1998

(30) Foreign Application Priority Data

Jun. 2, 1997 (DE) .............................. 197 23 079

(51) Int. Cl.$^7$ ...................................... G06F 11/00
(52) U.S. Cl. .............................. 714/25; 364/550
(58) Field of Search .............................. 714/25, 2, 8, 15, 714/16, 21, 27, 32, 37, 39, 44, 47–49, 742, 747, 764; 364/550, 264, 267, 424.03, 551.01, 554

(56) References Cited

U.S. PATENT DOCUMENTS

| | | | |
|---|---|---|---|
| 3,784,801 | * | 1/1974 | Caputo et al. ................. 235/153 AK |
| 4,395,767 | * | 7/1983 | Van Brunt et al. ..................... 371/25 |
| 4,517,639 | * | 5/1985 | Ferrell et al. ......................... 364/186 |
| 4,554,661 | * | 11/1985 | Bannister ................................ 371/15 |
| 4,835,459 | * | 5/1989 | Hamlin et al. ...................... 324/73 R |
| 5,293,323 | * | 3/1994 | Doskocil et al. ................ 364/551.01 |
| 5,465,321 | * | 11/1995 | Smyth ..................................... 395/22 |
| 5,586,130 | * | 12/1996 | Doyle ..................................... 371/62 |
| 5,655,075 | * | 8/1997 | Saito et al. ...................... 395/185.01 |
| 5,666,481 | * | 9/1997 | Lewis ............................... 395/182.02 |
| 5,671,141 | * | 9/1997 | Smith et al. ................... 364/424.034 |
| 5,784,547 | * | 7/1998 | Dittmar et al. .................. 395/182.02 |
| 5,937,366 | * | 8/1999 | Zbytniewski et al. ................ 702/108 |
| 5,974,114 | * | 10/1999 | Blum et al. ............................... 379/9 |
| 6,000,040 | * | 12/1999 | Culley et al. .................... 395/183.01 |

FOREIGN PATENT DOCUMENTS 195 23 483   1/1997  (DE) .
WO 95/32411  11/1995  (WO) .

* cited by examiner

Primary Examiner—Nadeem Iqbal
(74) Attorney, Agent, or Firm—Kenyon & Kenyon

(57) ABSTRACT

A fault diagnostic device for monitoring and detecting faults in technical functions, in particular in technical functions of a motor vehicle, includes a plurality of monitoring devices for monitoring technical functions, whether they have a fault or not. The fault diagnostic device also includes a storage device for storing (data concerning) direct mutual dependencies of the functions to be monitored, in the form of a matrix representation in the logical YES/NO form. Furthermore, the fault diagnostic device includes a processing device for determining the capacity for validation of faults in corresponding technical functions to be detected in the monitoring, in view of the matrix representation; for controlling the monitoring devices for carrying out the monitoring activities; and, assuming the capacity for validation, for validating the faults to be detected in the monitoring.

14 Claims, 3 Drawing Sheets

FAULT DIAGNOSTIC DEVICE AND METHOD

FIELD OF THE INVENTION

The present invention relates to a fault diagnostic device for monitoring and detecting faults in technical functions (e.g., operations), and in particular, in the technical functions (e.g., operations) of a motor vehicle and a corresponding fault diagnostic method. Although the present invention is applicable to fault diagnostics in any technical system, the device and method according to the present invention are described below with regard to a fault diagnostic system on board a motor vehicle.

BACKGROUND INFORMATION

With an increasing complexity of technical functions occurring on board a motor vehicle, there is an increasing difficulty in localizing faults that occur and assigning them to relevant components. In the context of On-Board-Diagnoses in motor vehicles, as many technical functions as possible should be monitored within the motor vehicle, faults detected and assigned as precisely as possible to defective components, in order then, where a fault is in a component, to bring about a corresponding reaction of the system, e.g., to switch off the defective components.

In fault diagnostics in practice, there is a fundamental problem that directly measuring sensors are available only for some few technical functions, and that therefore the diagnosis of most functions must take place indirectly through monitoring symptoms.

Since, with such fault diagnosis, individual diagnostic functions interfere with each other in many cases, it is often possible, from a single fault symptom, to draw conclusions pointing to more than one cause of the fault. Therefore, distinctions must be made between the actual or true fault and secondary faults. Thus such fault diagnostic devices require a validating device which ascertains whether the component in question on the fault path is actually responsible for the fault symptom or only subject to a secondary influence.

The problem addressed by the device and method according to the present invention thus generally consists in examining fault signals with respect to their meaningfulness and, if possible, subsequently making possible a validation, to obtain certainty in the assertion of the actual cause of the fault.

First, the problem of the mutual dependence of faults is explained in more detail. This problem is based simply in physical or technical reciprocal effects.

There are functions in which the influence occurs only in one direction, master-slave functions, which can be schematically depicted as:

$$A \rightarrow B$$

An example is catalytic converter monitoring, which takes place using a lambda probe (oxygen sensor) located behind the catalytic converter. In this context, the correct function of the lambda probe must first be ensured, before it is possible to conclude that a possible fault has occurred in the catalytic converter. In other words, it is assumed that if there is a fault in both diagnoses, that the fault of the lambda probe is responsible for the fault of the catalytic converter. The lambda probe is thus the master and the catalytic converter is the slave.

It is known in the art that the dependent slave function has to wait for a fault-free examination of the superordinate master function. With master-slave functions, a fault of the master function can indeed falsely appear as a fault of the slave function, but not the other way around. Furthermore, usually in the master-slave functions, which influence each other only in one direction, when a fault is detected in the master function, the slave function must be blocked to avoid sequential fault entries in functions in master-slave chains, which in turn depend on the slave function.

In the past, in order to validate the fault, a certain sequence of fault diagnoses has been necessary. In this connection, problems arise in practice. For some diagnostic functions should not or cannot run simultaneously with certain operating functions. It is true that if the fault diagnostic device has to wait each time for the presence of a certain operating function, then the fault diagnosis, under certain circumstances, would proceed very slowly.

The situation is even more complex where functions that influence each other in both directions, i.e., with cyclical master-slave dependencies, such as can occur in the simplest case thus:

$$A \rightarrow B \rightarrow A \text{ or } A \leftrightarrow B$$

If the diagnosis of function A yields a fault, the diagnosis of function B is necessary to validate the fault in A. However, for validating B, A is necessary in turn, which makes it impossible, from these functions A and B, to determine the true fault and the secondary fault. This is a simple deadlock situation. An example of a deadlock situation is the examination of functions of the secondary air valve and of the tightness of the suction line by measuring the air ratio as measuring parameter.

A deadlock situation, or, more succinctly, a deadlock, always results when two mutually influencing functions both indicate a fault and block each other so that neither can the fault subsequently be confirmed nor its removal be detected.

A deadlock situation can also arise from more than two functions, i.e., if the following sort of dependence obtains:

$$A \rightarrow B \rightarrow C \rightarrow A$$

It may be referred to as a general or indirect deadlock if each one of the functions A, B, C indicates a fault.

In the past, for validating such faults, one direction of simple or general deadlocks was completely neglected, and indeed usually in accordance with the probability of occurrence of the fault in question. The closed cycle was broken where the smallest probability of a fault was expected.

In the above-described conventional design, the fact that it cannot systematically take account of deadlocks has proven to be disadvantageous. Therefore, a fault diagnosis system is required, which makes possible any and all sequences of fault diagnoses at a correspondingly high speed and in which, after the event, the mutual dependance of faults can accordingly be taken account of.

SUMMARY OF THE INVENTION

A fault diagnostic device according to the present invention and a corresponding fault diagnostic method have an advantage, in contrast to the conventional attempt at a solution, that a detection of deadlock situations can proceed significantly more simply and reliably. Thus, the system can have a unified reaction, which is still a function only of whether a deadlock situation is present or not. In addition, if suitable functions are available, deadlocks can also be resolved in a simple manner. A particular advantage of the fault diagnostic device according to the present invention is that the monitoring of the technical functions can be conducted in any sequence and at high speed, without one monitoring function having to wait for another. Thus it is expedient if the monitoring is not controlled by the possibility of validation, but rather the validation is conducted after the monitoring.

One of the objects of the present invention is to provide for a representation in a table or a matrix form of the mutual technical or physical direct dependencies, in pairs, in both directions. In this context, the representation occurs in the logical YES/NO form. Here, the concept of matrix representation should be understood in the general sense, i.e., as any type of representation permitting double indexing.

In this context, where the direct dependence of a technical function A on technical function B, it should be understood that A is the slave of master B, i.e., if a fault is present in B, the fault message from A is not reliable.

According to a preferred exemplary refinement, a direct deadlock is detected where the matrix representation of two technical functions having two logical YES entries which are symmetrical to the main diagonal. This is a significant advantage, for, in the past, one direction of deadlocks was simply ignored.

According to another preferred exemplary embodiment of the present invention, if at least three technical functions exist, all matrix representations of direct dependencies of the technical functions are formed, reduced at most to three. Then it is established whether any one of the reduced matrix representations consists of linearly independent logical line- or column-unit vectors. Should any one of the reduced matrix representations consist of linearly independent logical line- or column-unit vectors, an indirect deadlock is detected.

According to yet another exemplary embodiment of the present invention, the determinant of the reduced matrix representations is calculated. This makes it possible to detect an indirect deadlock using simple calculations.

According to a further exemplary preferred refinement, it is determined whether a technical function exists which is dependent on only one technical function underlying the deadlock, further functions on which this function depends being free of faults, and further functions on which the function underlying the deadlock depends being free of faults. If a technical function of this sort can be detected, the deadlock regarding the technical function of that sort is resolved and the faultiness of the technical functions detected as faulty and underlying the deadlock is validated. This systematic detection of the resolvability of deadlocks is only made possible as a result of the method according to the present invention.

DETAILED DESCRIPTION OF THE INVENTION

Figures 1, 4:
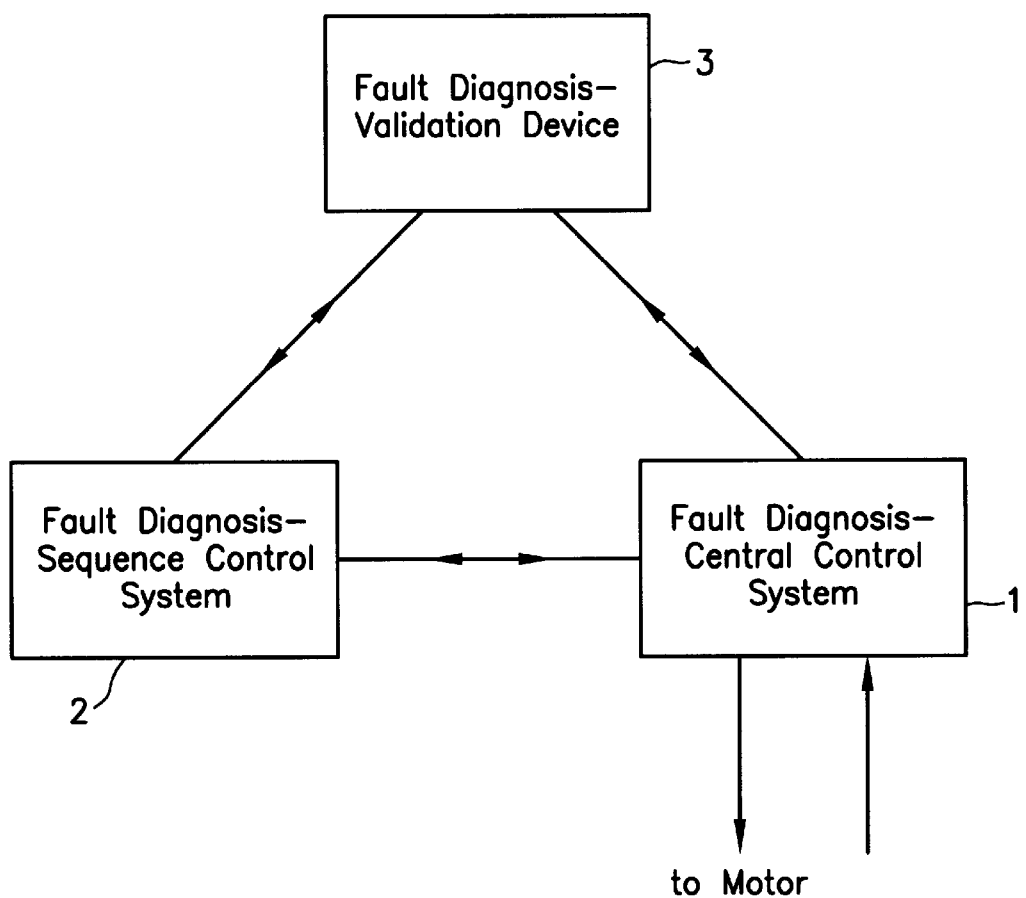
FIG. 1 shows a schematic representation of components of a fault diagnostic device according to the present invention.
FIG. 4 shows a reduced matrix representation of the mutual dependencies of the technical functions A, B, X, Y according to FIG. 3, to illustrate the method according to the present invention in the case of an indirect deadlock among A, B, X and Y.

FIG. 1 shows a schematic representation of the components of a fault diagnostic device according the present invention. In particular, FIG. 1 shows a fault diagnosis-central control system 1, a fault diagnosis-sequence control system 2 and a fault diagnosis-validation device 3.

The fault diagnosis-central control system 1 is a central unit, where the results of the diagnosis functions are stored and where all data required for the diagnosis are administered. The fault diagnosis-central control system 1 functions as interface for the diagnosis functions and the motor functions.

The fault diagnosis-control sequence system 2 controls the sequencing of the diagnostic functions and some motor functions or actuator functions, relevant thereto, based on a priority principle. In addition, it deactivates diagnoses which are based on a secondary fault on the basis of a master-slave relation having a defective master.

The fault diagnosis-validation device 3 determines, in the case of fault signals, whether the function signaled as faulty shows a true fault or a secondary fault, assuming that, in the case in question, this is possible in the first place. The fault-diagnosis-validation device 3 can direct queries to the fault diagnosis-control sequence system 2, if it should require certain diagnosis function results for the validation.

Figure 2:
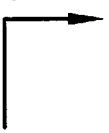
FIG. 2 shows a matrix representation, in cutaway portions, of mutual dependencies of technical functions A to Z, to illustrate the method according to the present invention in the case of a direct deadlock between X and Y.

FIG. 2 shows a matrix representation, in cutaway portions, of the mutual dependencies of technical functions A to Z, to illustrate the method according to the present invention in the case of a direct deadlock between X and Y. In FIG. 2, a "1" of a matrix representation designates a direct technical dependency in one direction, a "0" designates no direct technical dependency. The representation is complete only for the functions A, B, C and X, Y, Z in dependence on A, B, C and X, Y, Z.

For example, function C is dependent on the result of function A, but conversely function A is not dependent on function C. Moreover, function X is dependent on the result of function Y, and, conversely, function Y is dependent on the result of function X, as the "1" entries symmetrical to the main diagonal indicate. Thus, a deadlock situation can arise here, if both functions indicate a fault.

Functions A and B can resolve the deadlock, for A is only dependent on Y, but not on X. B is only dependent on X, but not on Y, and X is not dependent on B. If A, B, X or Y have other masters, that is not disruptive as long as the latter are free of faults. Therefore, a fault in A and no fault in B shows that Y is the cause of the fault. A fault in B and no fault in A shows that X is the cause of the fault. An exclusive OR-linkage of the lines of the technical functions causing a deadlock situation can indicate functions A and B, the functions being able to resolve the deadlock.

Figure 3:
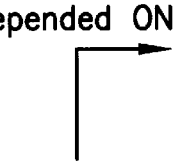
FIG. 3 shows a matrix representation, in cutaway portions, of the mutual dependencies of the technical functions A to Z, to illustrate the method according to the present invention in the case of an indirect deadlock among A, B, X and Y.

FIG. 3 shows a matrix representation in cutaway portions of the mutual dependencies of technical functions A to Z to illustrate the method according to the present invention in the case of an indirect deadlock among A, B, X and Y. Furthermore, the matrix representation according to the present invention also makes possible a simple detection of indirect deadlocks. In such a case, as mentioned above, more than two functions of this sort mutually influence each other such that in each case the result of the one function influences the result of another function only in one direction and not the other way around, but the mutual influences form a closed chain. According to the presentation of FIG. 3, the following closed chain can be discerned:

$$B \rightarrow A \rightarrow Y \rightarrow X \rightarrow B.$$

FIG. 4 shows a reduced matrix representation of the mutual dependencies of technical functions A, B, X, and Y according to FIG. 3 to illustrate the method according to the present invention in the case of the indirect deadlock among A, B, X and Y. In this context, a regularity can be seen in the fact that the matrix representation reduced to these functions A, B, X, and Y include linearly independent logical line- or column-unit vectors. Each and every combination of at least three functions, which can be reduced to this form, contains an indirect deadlock. The above lines- and columns criterion can be replaced by mathematically equivalent criteria, such as, non-singularity of the reduced matrix or the non-disappearing determinant of the reduced matrix.

A validation is possible in the case of the general or indirect deadlock, as also in the case of the direct deadlock via third functions, which stand in a Master-Slave relation to a function underlying the deadlock. Accordingly, the present invention allows a systematic simple evaluation of the dependence of simultaneously arising faults of the monitored technical functions and gives complete information on the existing validation possibilities.

Although the present invention has been described on the basis of the above-described exemplary embodiment, it is not limited thereto, but rather can be modified in many ways. In particular, in the above exemplary embodiment of the fault diagnosis-central control system, the fault diagnosis-control sequence system and the fault diagnosis-validation device are shown as separate units. In practice, however, it is expedient to integrate these units in a microprocessor system having suitable software.

What is claimed is:

1. A fault diagnostic device for monitoring and detecting faults in technical functions of an apparatus, comprising:
    monitoring devices monitoring the technical functions and determining one of a fault condition and a no fault condition;
    a storage device storing data corresponding to direct mutual dependencies of the technical functions being monitored, the data being stored as a matrix in a logical YES/NO form; and
    a processing device:
        a) determining a validation capacity of the faults to be detected in the technical functions using the matrix,
        b) controlling the monitoring devices, and
        c) validating the faults, if the validation capacity is sufficient.

2. The device according to claim 1, wherein the apparatus is a motor vehicle.

3. The device according to claim 1, wherein the processing device detects a direct deadlock if the matrix of each of two of the technical functions includes a corresponding YES entry being symmetrical to a main diagonal of the matrix.

4. The device according to claim 1, wherein the processing device:
    forms all of reduced matrices of the direct mutual dependencies without forming a maximum of three of the reduced matrices if at least three of the technical functions are present,
    determines if one of the reduced matrices includes one of a linearly independent logical line-unit vector and a linearly independent logical column-unit vector, and
    detects an indirect deadlock if one of the reduced matrices includes one of the linearly independent logical line-unit vector and the linearly independent logical column-unit vector.

5. The device according to claim 4, wherein the processing device calculates a determinant of the reduced matrices.

6. The device according to claim 3, wherein the processing device:
    d) determines if at least one function of the technical functions is dependent only on a deadlock operation corresponding to the direct deadlock, the at least one function depending on further functions, the further functions having no faults and no additional functions, and
    e) if the at least one function can be determined, resolves the direct deadlock corresponding to the at least one function and validates the fault condition of the technical functions detected as faulty corresponding to the direct deadlock.

7. The device according to claim 4, wherein the processing device:
    d) determines if at least one function of the technical functions is dependent only on a deadlock operation corresponding to a further deadlock, the further deadlock being one of the direct deadlock and the indirect deadlock, the at least one operation depending on further functions, the further functions having no faults and no additional functions, and
    e) if the at least one function can be determined, resolves the further deadlock corresponding to the at least one function and validates the fault condition of the technical functions detected as faulty corresponding to the further deadlock.

8. A method for monitoring and detecting faults of technical functions of an apparatus, comprising the steps of:
    determining the technical functions to be monitored;
    providing direct mutual dependencies of the technical functions as a matrix in a logical YES/NO form;
    determining a validation capacity of the faults using the matrix;
    controlling monitoring devices, the monitoring devices monitoring the technical functions; and
    if the validation capacity is sufficient, validating the faults.

9. The method according to claim 8, wherein the apparatus is a motor vehicle.

10. The method according to claim 8, further comprising the step of:
    detecting a direct deadlock if the matrix of each of two of the technical functions includes a corresponding YES entry being symmetrical to a main diagonal of the matrix.

11. The method according to claim 8, further comprising the steps of:
    forming all of reduced matrices of the direct mutual dependencies without forming a maximum of three of the reduced matrices if at least three of the technical functions are present,
    determining if one of the reduced matrices includes one of a linearly independent logical line-unit vector and a linearly independent logical column-unit vector, and
    detecting an indirect deadlock if one of the reduced matrices includes one of the linearly independent logical line-unit vector and the linearly independent logical column-unit vector.

12. The method according to claim 11, further comprising the step of:

determining a determinant of the reduced matrices.

13. The method according to claim 10, further comprising the steps of:

determining if at least one function of the technical functions is dependent only on a deadlock operation corresponding to a further deadlock, the further deadlock being one of the direct deadlock and the indirect deadlock, the at least one function depending on further functions, the further functions having no faults and no additional functions, and if the at least one function can be determined, resolving the further deadlock corresponding to the at least one function and validating the fault condition of the technical functions detected as faulty corresponding to the further deadlock.

14. The method according to claim 11, further comprising the steps of:

determining if at least one function of the technical functions is dependent only on a deadlock operation corresponding to a further deadlock, the further deadlock being one of the direct deadlock and the indirect deadlock, the at least one function depending on further functions, the further functions having no faults and no additional functions, and if the at least one function can be determined, resolving the further deadlock corresponding to the at least one function and validating the fault condition of the technical functions detected as faulty corresponding to the further deadlock.

* * * * *